United States Patent
Hirata et al.

(10) Patent No.: US 8,555,920 B2
(45) Date of Patent: Oct. 15, 2013

(54) FLOW RATE RATIO VARIABLE TYPE FLUID SUPPLY APPARATUS

(75) Inventors: Kaoru Hirata, Osaka (JP); Yohei Sawada, Osaka (JP); Ryousuke Dohi, Osaka (JP); Kouji Nishino, Osaka (JP); Nobukazu Ikeda, Osaka (JP)

(73) Assignee: Fujikin Incorporated, Osaka (JP)

( * ) Notice: Subject to any disclaimer, the term of this patent is extended or adjusted under 35 U.S.C. 154(b) by 728 days.

(21) Appl. No.: 12/303,841

(22) PCT Filed: Jun. 13, 2007

(86) PCT No.: PCT/JP2007/000629
§ 371 (c)(1),
(2), (4) Date: Dec. 8, 2008

(87) PCT Pub. No.: WO2008/001484
PCT Pub. Date: Jan. 3, 2008

(65) Prior Publication Data
US 2010/0229976 A1  Sep. 16, 2010

(30) Foreign Application Priority Data

Jun. 27, 2006 (JP) .................................. 2006-177156

(51) Int. Cl.
*F17D 1/04* (2006.01)
(52) U.S. Cl.
USPC ................................. 137/599.07; 137/601.18
(58) Field of Classification Search
USPC ............. 137/599.07, 599.01, 599.05, 599.06, 137/601.18, 833
See application file for complete search history.

(56) References Cited

U.S. PATENT DOCUMENTS 3,417,431 A * 12/1968 Majoch ........................ 425/381
4,030,523 A *  6/1977 Cram et al. ............... 137/599.07
4,256,100 A *  3/1981 Levy et al. ................ 128/204.21
(Continued)

FOREIGN PATENT DOCUMENTS

JP  58-084313  5/1983
JP   2-84913  7/1990
(Continued)

OTHER PUBLICATIONS

International Search Report issued in corresponding application No. PCT/JP2007/000629, completed Jul. 9, 2007 and mailed Jul. 17, 2007.

(Continued)

*Primary Examiner* — Eric Keasel
*Assistant Examiner* — Daniel Edelbrock
(74) *Attorney, Agent, or Firm* — Griffin & Szipl, P.C.

(57) ABSTRACT

A flow rate ratio variable type fluid supply apparatus includes a flow rate control system supplying gas of flow rate Q that is diverted to first flow diverting pipe passage and second flow diverting pipe passage with prescribed flow rates $Q_1/Q_0$ so gas is supplied to a chamber, and a first orifice having opening area $S_1$ is installed on the first flow diverting passage, and the second flow diverting passage is connected to a plurality of branch pipe passages connected in parallel, orifices having opening area installed on the branch passages, and open/close valves installed on all, or some of, the branch passages so gas is diverted to flow diverting passages with flow rate ratio $Q_1/Q_0$ equivalent to the ratio of the first orifice and the total opening area $S_2o$ of flow passable orifices of the second flow diverting passage by regulating total opening area of the flow passable orifices.

15 Claims, 11 Drawing Sheets

(56) References Cited

U.S. PATENT DOCUMENTS

| | | | | |
|---|---|---|---|---|
| 4,644,967 | A | * | 2/1987 | Wyatt et al. ............... 137/599.05 |
| 5,329,965 | A | * | 7/1994 | Gordon .................... 137/599.07 |
| 5,469,749 | A | * | 11/1995 | Shimada et al. ........... 73/861.47 |
| 5,816,285 | A | * | 10/1998 | Ohmi et al. ................. 137/487.5 |
| 5,905,317 | A | * | 5/1999 | Aoki ........................ 267/140.14 |
| 6,152,168 | A | * | 11/2000 | Ohmi et al. ................. 137/487.5 |
| 6,158,679 | A | * | 12/2000 | Ohmi et al. .................... 239/589 |
| 6,848,470 | B2 | * | 2/2005 | Ohmi et al. ................. 137/487.5 |
| 6,871,803 | B1 | * | 3/2005 | Ohmi et al. .................... 239/596 |
| 6,893,152 | B2 | * | 5/2005 | Cordier et al. .................. 374/40 |
| 7,059,363 | B2 | * | 6/2006 | Sugiyama et al. ................ 141/1 |
| 2005/0005994 | A1 | | 1/2005 | Sugiyama et al. |

FOREIGN PATENT DOCUMENTS

| | | |
|---|---|---|
| JP | 2003-323217 | 11/2003 |
| JP | 2004-005308 | 1/2004 |
| JP | 2005-011258 | 1/2005 |

OTHER PUBLICATIONS

Definition of "Outlet" Webster's Ninth New Collegiate Dictionary 838.

\* cited by examiner

Verification of accuracy when the downstream side is in a state of vacuum
(Pressure P2 on the downstream side from an orifice = 20 Torr)

FIG. 7

PRIOR ART

PRIOR ART

FLOW RATE RATIO VARIABLE TYPE FLUID SUPPLY APPARATUS

This is a National Phase Application in the United States of International Patent Application No. PCT/JP2007/000629 filed Jun. 13, 2007, which claims priority on Japanese Patent Application No. 2006-177156, filed Jun. 27, 2006. The entire disclosures of the above patent applications are hereby incorporated by reference.

FIELD OF THE INVENTION

The present invention is used for semiconductor manufacturing facilities, and the like, and relates to a flow rate ratio variable type fluid supply apparatus that makes it possible to divert a gas of a set flow rate supplied from a flow rate control system so that it is supplied to a chamber with a desired flow rate ratio.

BACKGROUND OF THE INVENTION

In recent years, there has been a trend seen in that silicon wafers having a larger diameter are used for semiconductor manufacturing. For this reason, when semiconductor manufacturing apparatuses are used, it has become necessary to supply a treatment gas to a chamber through a plurality of supply lines, and to precisely control a flow rate ratio of the gas passing through these supply lines.

Figure 7:
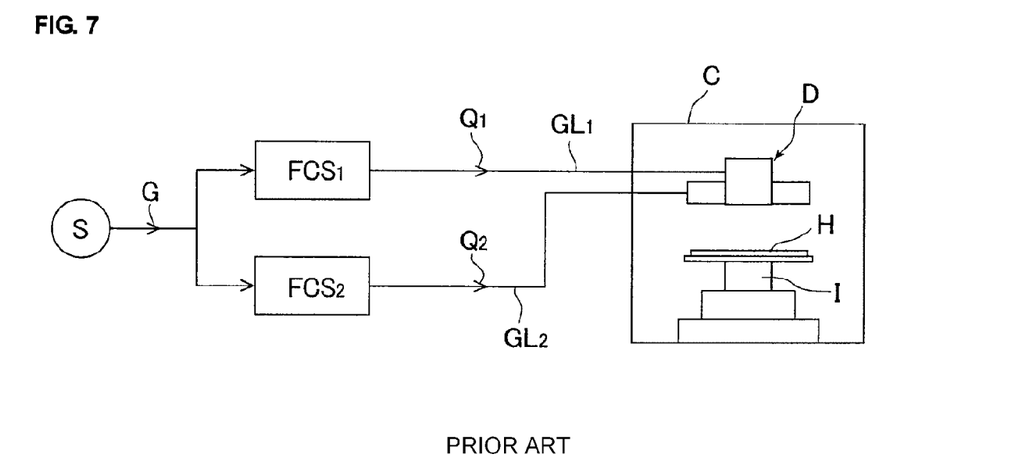
FIG. 7 is an explanatory drawing of a conventional gas supply apparatus for a chamber that employs a plurality of lines.

FIG. 7 illustrates one example of a gas supply system with which gas is supplied to a chamber through a plurality of supply lines for a conventional semiconductor manufacturing apparatus, wherein flow rate control systems $FCS_1$, $FCS_2$ are provided with gas supply lines $GL_1$, $GL_2$, respectively, thus allowing regulation of the flow rate ratio $\gamma = Q_1/Q_2$ of the supply lines $GL_1$, $GL_2$. In FIG. 7, $S_T$ designates a gas supply line, G designates a treatment gas, C designates a chamber, D designates a gas discharger, H designates a wafer, and I designates a wafer holding base. However, with the apparatus as shown in FIG. 7, two flow rate control system units $FCS_1$, $FCS_2$ are required, which upsizes the semiconductor manufacturing apparatus and raises costs for equipment and maintenance, thus making it difficult to downsize equipment and to reduce costs.

Figure 8:
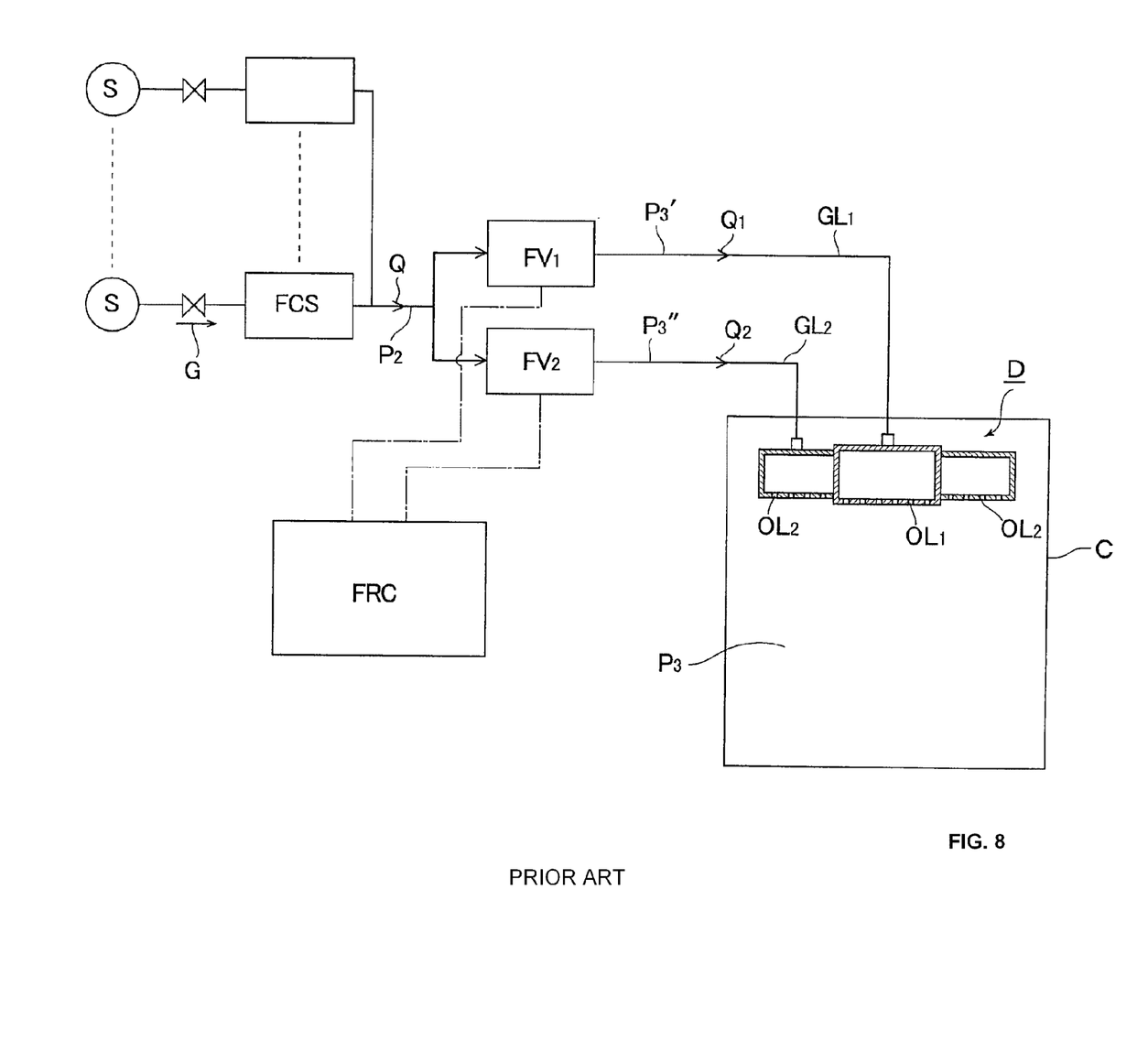
FIG. 8 is another explanatory drawing of another conventional gas supply apparatus for a chamber that employs a plurality of lines.

FIG. 8 shows gas supply equipment previously developed by the inventor of the present invention in order to improve the aforementioned shortcomings of the equipment shown in FIG. 7, wherein gas G is controlled to have a flow rate Q set by the flow rate control system FCS so that gas G is supplied to a chamber C with a desired flow rate ratio $\gamma = Q_1/Q_2$ through supply lines $GL_1$, $GL_2$, which are provided with pressure type diverted flow rate controllers $FV_1$, $FV_2$ controlled by a diverted flow rate control apparatus FRC.

In particular, the gas supply apparatus shown in FIG. 8 is provided with a gas discharger D, which is equipped with orifices $OL_1$, $OL_2$ having specific diameters $\phi_1$, $\phi_2$, respectively, installed inside the chamber C. The gas supply apparatus of FIG. 8 is made so that gas of a total quantity $Q = Q_1 + Q_2$ is supplied into the chamber C with desired diverted flow rates $Q_1$ and $Q_2$, expressed by $Q_1 = K_1 P_3'$ and $Q_2 = K_2 P_3''$ (where $K_1$ and $K_2$ are constants determined by the cross sectional areas, and the like, of orifices $OL_1$, $OL_2$), passing through the orifices $OL_1$, $OL_2$, respectively, of the gas discharger D by regulating the gas pressure $P_3'$, $P_3''$ on the downstream side by using the diverted flow rate controllers $FV_1$, $FV_2$. (Japanese Unexamined Patent Application Publication No. 2004-5308)

However, with the gas supply apparatus shown in FIG. 8, there remains a problem in that the shape, and the like, of the gas discharger D are subsequently restricted because the gas supply apparatus includes that gas discharger D, equipped with orifices $OL_1$, $OL_2$ having specified diameters $\phi_1$, $\phi_2$, installed inside the chamber C. Because two flow rate control system units $FCS_1$, $FCS_2$ are not needed by the apparatus shown in FIG. 8, compared with the aforementioned gas supply apparatus shown in FIG. 7, costs for equipment, and the like, can be reduced in comparison with the aforementioned gas supply apparatus of FIG. 7. However, it is disadvantageous in that the gas supply apparatus of FIG. 8 requires two diverted flow rate controller units $FV_1$, $FV_2$, and also a diverted flow control apparatus FRC. This fact doesn't allow installation costs to be substantially reduced and it doesn't allow drastic downsizing of the diverted gas supply apparatus. In addition, another disadvantage is that it becomes too complicated to control of the flow rate ratio $Q_1/Q_2$.

Figure 9:
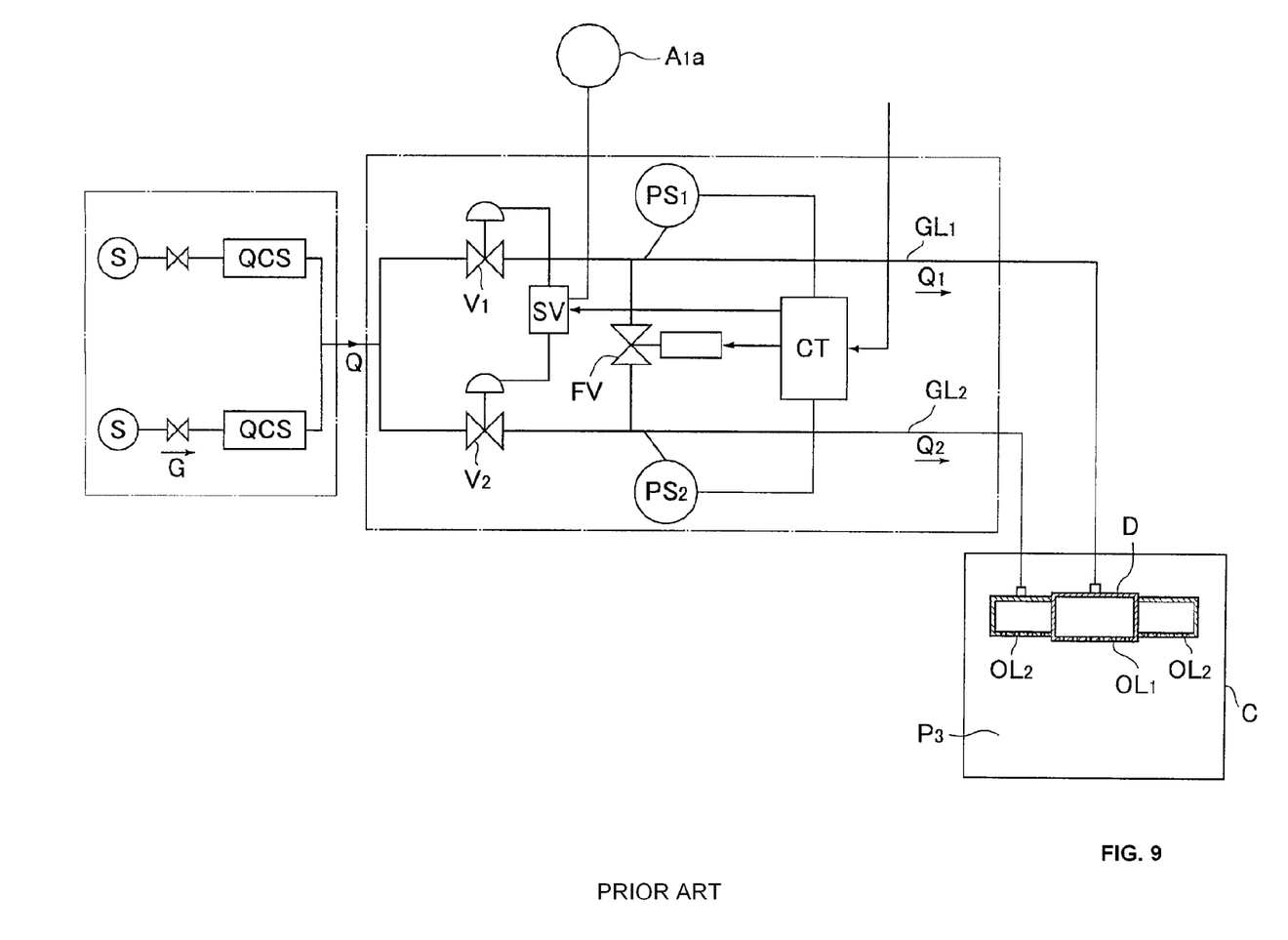
FIG. 9 is yet another explanatory drawing of yet another conventional gas supply apparatus for a chamber that employs a plurality of lines.

Furthermore, FIG. 9 illustrates another system that has been developed previously by the inventors of the present invention to overcome the aforementioned shortcomings of the gas supply system shown in FIG. 8 (Japanese Unexamined Patent Application Publication No. 2004-5308). The gas supply system of FIG. 9 is constituted so that by using simply structured open/close valves $V_1$, $V_2$, a pressure type diverted flow rate controller SV, and a flow rate ratio control apparatus CT, the total flow rate $Q = Q_1 + Q_2$ of the gas flow G is supplied into the chamber C with a desired diverted flow rate ratio $\gamma = Q_1/Q_2$ in such a manner that the open/close valve of the supply line with a larger flow rate is fully opened and the degree of opening of a pressure type diverted flow rate controller SV is regulated, so as to conduct pressure adjustment of both diverted supply lines $GL_1$, $GL_2$ by regulating gas flow rate from a supply line on the larger flow rate side to a supply line on the smaller flow rate side. (Japanese Unexamined Patent Application Publication No. 2005-11258)

However, the same disadvantages with the aforementioned gas supply apparatus shown in FIG. 8 (Japanese Unexamined Patent Application Publication No. 2004-5308) remain unsolved even with the gas supply apparatus of FIG. 9, so it has not been possible to substantially downsize the gas supply apparatus and to reduce equipment costs drastically, and also it has not been possible to freely choose the form of the gas discharger D without limitation.

Figure 10:
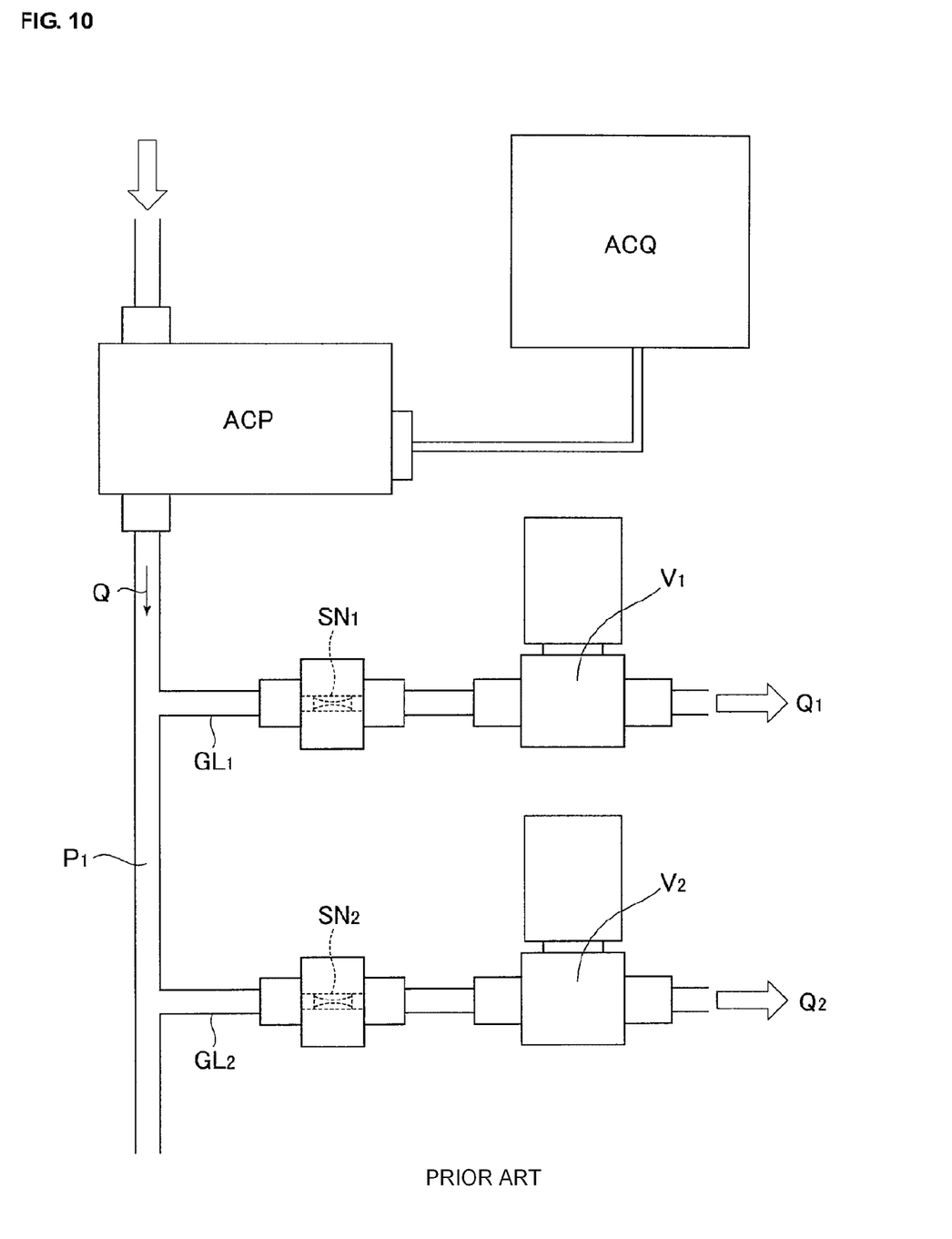
FIG. 10 is an explanatory drawing showing one example of a conventional flow diverting gas supply apparatus that employs a sonic velocity nozzle.

As shown in FIG. 10, flow rate control systems (Japanese Unexamined Patent Application Publication No. 2003-323217 and others) have been developed as a kind of flow diverting gas supply apparatus, wherein branch supply passages $GL_1$, $GL_2$ are equipped with sonic velocity nozzles $SN_1$, $SN_2$, respectively, and the pressure $P_1$ on the upstream side pipe passage from the sonic velocity nozzles $SN_1$, $SN_2$ is regulated using an automatic pressure controller ACP, thus allowing gas supply quantities $Q_1$, $Q_2$ from the branch supply passages $GL_1$, $GL_2$ to be regulated. In FIG. 10, ACQ designates a flow rate control part, and $V_1$, $V_2$ designate control valves.

An object of the flow diverting supply apparatus is to simultaneously control gas flow rates $Q_1$, $Q_2$ passing through sonic velocity nozzles $SN_1$, $SN_2$ (or orifices) in a manner such that the primary side pressure $P_1$ is regulated using an automatic pressure controller ACP. It is not an immediate object of the invention to regulate the flow rate ratio $\gamma = Q_1/Q_2$ of the branch pipe passages $GL_1$, $GL_2$ at any given ratio.

Patent Document 1: Japanese Unexamined Patent Application Publication No. 2004-5308
Patent Document 2: Japanese Unexamined Patent Application Publication No. 2005-11258
Patent Document 3: Japanese Unexamined Patent Application Publication No. 2003-323217

OBJECT OF THE INVENTION

The primary object of the present invention is to provide a downsized and low cost flow rate ratio variable type fluid supply apparatus that makes it possible to divert a gas of a prescribed flow rate Q and to supply the diverted gas with a diverted flow rate ratio as desired by using an extremely simply structured open/close valve and orifice. In this way, the present invention solves the aforementioned shortcomings encountered with the conventional apparatus for supplying a diverted gas to a chamber, which include that substantial reduction in size and cost cannot be achieved with the conventional diverted gas supply apparatus because the conventional apparatus requires an automatic pressure controller, an open/close control valve, and a control part thereof, and furthermore, it is found that the accuracy of the conventional apparatus in controlling a diverted flow ratio is low.

SUMMARY OF THE INVENTION

Through the process of developing varied flow rate control apparatuses for which an orifice is employed, the inventors of the present invention have postulated that, under the conditions of critical expansion, an extremely simply structured flow rate ratio variable type fluid supply apparatus can produced by means of adjusting, with high accuracy, the value of a so-called correction coefficient of an orifice to a set value.

The present invention is, therefore, a creation based on the aforementioned idea of the inventors of the present invention. The present invention, in accordance with a first embodiment, is fundamentally constituted so that a flow rate ratio variable type fluid supply apparatus is used to divert a gas of a flow rate Q supplied from a flow rate control system 6 so that the gas flows to a plurality of flow diverting pipe passages $1_1$ to $1_n$ with prescribed flow rates $Q_1$ to $Q_n$, respectively. Thus, gas of a flow rate Q is supplied through the flow diverting pipe passages $1_1$ to $1_n$ into a chamber, and orifices 3 . . . having appropriate opening areas $S_1$ . . . are installed on one or a plurality of flow diverting pipe passages among the aforementioned flow diverting pipe passages $1_1$ to $1_n$, and the aforementioned remaining flow diverting pipe passages serve as a pipe passage to which a plurality of branch pipe passages $2_a$ to $2_n$ are connected in parallel, and orifices 4 . . . having appropriate opening areas $S_{2O}$ . . . are installed on the aforementioned branch pipe passages 2a to 2n, respectively. Also, open/close valves $V_b$ to $V_n$ are installed on all, or some of, the aforementioned branch pipe passages so that gas of the flow rate Q is diverted so as to flow to diverting pipe passages $1_1$ to $1_n$ with a flow ratio of $Q_1/Q_2/Q_3 \ldots Q_n$ equivalent to the ratio of the opening area $S_1 \ldots$ of orifices 3 on the aforementioned flow diverting pipe passages. By this structure, the total opening area $S_{2O}$ of flow-passable orifices on the flow diverting pipe passages, provided with branch pipe passages by means of the total opening area $S_{2O} \ldots$ of flow-passable orifices of the remaining flow diverting pipe passages, are regulated by the open/close operation of the open/close valves Vb to Vn.

The present invention, in accordance with a second embodiment, is fundamentally constituted so that the flow rate ratio variable type fluid supply apparatus is used to divert gas of a flow rate Q so that the gas is supplied from the flow rate control system 6 flows to the plurality of flow diverting pipe passages $1_1$ to $1_n$ with prescribed flow rates $Q_1$ to $Q_0$, respectively, so that gas of flow rate Q is supplied through flow diverting pipe passages $1_1$ to $1_n$ into the chamber, and wherein orifices $3_1$ to $3_{n-1}$ having opening areas $S_1$ to $S_{n-1}$ are installed on the aforementioned flow diverting pipe passage $1_1$ to flow diverting pipe passage $1_{n-1}$, and the aforementioned remaining flow diverting pipe passage in is used as the pipe passage to which the plurality of branch pipe passages 2a to 2n are connected in parallel, and orifices 4a to 4n having opening areas $S_{2a}$ to $S_{2n}$ are installed on the aforementioned branch pipe passages $2_a$ to $2_n$, respectively. Also, open/close valves $V_b$ to $V_n$ are installed on all, or some of, the aforementioned branch pipe passages so that gas of flow rate Q is diverted and flows to the flow diverting pipe passages $1_1$ to $1_n$ with a flow ratio of $Q_1/Q_2/Q_3 \ldots Q_{n-1}/Q_0$ that is equivalent to the ratio of opening areas of orifices $3_1$ to $3_{n-1}$ on the aforementioned flow diverting pipe passages $1_1$ to $1_n$ and the total opening area $S_{20}$ of the flow-passable orifice on the flow diverting pipe passage $1_n$ by regulating the total opening area $S_{20}$ of flow-passable orifices on the flow diverting pipe passages $1_n$ using the open/close operation of the open/close valves $V_b$ to $V_n$.

The present invention, in accordance with a third embodiment, modifies the first embodiment or the second embodiment so that an orifice 3 is constituted with an orifice 3a that has a constant opening area $S_{11}$ and an orifice 3b that has an opening area $S_{12}$ that is adjustable and is connected in parallel with orifice 3a.

The present invention, in accordance with a fourth embodiment, is fundamentally constituted so that the flow rate ratio variable type fluid supply apparatus diverts gas of flow rate Q supplied from the flow rate control system 6 so that gas flows to the No. 1 flow diverting pipe passage 1 and the No. 2 flow diverting passage 2 with prescribed flow rates $Q_1$, $Q_0$, respectively, so that gas of flow rate Q is supplied through both flow diverting pipe passages 1, 2 into the chamber, wherein the No. 1 orifice 3 has an opening area $S_1$ and is installed on the aforementioned No. 1 flow diverting pipe passage 1, and also the aforementioned No. 2 flow diverting pipe passage 2 is made to be a pipe passage to which a plurality of branch pipe passages 2a to 2n are connected in parallel, and orifices 4a to 4n having opening areas $S_1$a to $S_2$n are installed on the aforementioned branch pipe passages 2a to 2n, respectively, and open/close valves Vb to Vn are installed on all, or some of, the aforementioned branch pipe passages so that gas of flow rate Q is diverted to flow to flow diverting pipe passages 1, 2 with a flow rate ratio $Q_1/Q_0$ equivalent to the ratio of the opening area of the No. 1 orifice 3 of the aforementioned No. 1 flow diverting pipe passage 1 and the total opening area $S_{20}$ of the flow-passable orifices of the aforementioned No. 2 flow diverting pipe passage 2 by means of regulating the total opening area $S_{20}$ of flow-passable orifices of the No. 2 flow diverting pipe passage 2 by the open/close operation of the open/close valves Vb to Vn.

The present invention, in accordance with a fifth embodiment, further modifies the fourth embodiment so that the No. 1 orifice 3, having an opening area $S_1$, is constituted with an orifice 3a having a constant opening area $S_{11}$ and an orifice 3b having an opening area $S_{12}$ that is made to be adjustable and that is connected in parallel with the orifice 3a so that the No. 1 orifice 3 is formed.

The present invention, in accordance with a sixth embodiment, modifies the fourth embodiment so that the No. 2 flow diverting pipe passage 2 is formed by a plurality of branch pipe passages 2a to 2n, and the opening area $S_2$a of the orifice 4a of the branch pipe passage 2a and the aforementioned opening area $S_1$ of the No. 1 orifice 3 of the No. 1 flow diverting pipe passage 1 are made to be identical, and the branch pipe passage 2a is connected to the No. 2 branch pipe passage without installing an open/close valve therebetween.

The present invention, in accordance with a seventh embodiment, further modifies the fourth embodiment so that the No. 2 flow diverting pipe passage 2 is formed by four branch pipe passages 2a to 2d, wherein the opening area $S_2$a of the orifice 4a of the branch pipe passage 2a and the opening area $S_1$ of the No. 1 orifice 3 of the No. 1 branch pipe passage are made to be identical, and also the opening areas $S_2$b to $S_4$d of the orifices 4b to 4d of the remaining branch pipe passages 2b to 2d are made to be 5%, 10% and 20%, respectively, of the opening area $S_1$ of the No. 1 orifice 3 of the aforementioned No. 1 branch pipe passage, and the remaining branch pipe passages 2b to 2d are provided with open/close valves Vb to Vd, respectively.

The present invention, in accordance with an eighth embodiment, further modifies the fourth embodiment so that the open/close valves Vd to Vn are the only ones with which branch pipe passages 2d to 2n can be either fully opened or fully closed.

The present invention, in accordance with a ninth embodiment, further modifies the fourth embodiment so that the opening areas of orifices 3, and 4a to 4n can be set at appropriate values selecting the correction coefficient depending on the orifice shape and pressure conditions on the upstream side from the orifices.

The present invention, in accordance with a tenth embodiment, further modifies the ninth embodiment so that the correction coefficient is 0.6 or 0.7 depending on how the shape of a diameter ϕ of the orifices 3, and 4a to 4n has been processed.

The present invention, in accordance with an eleventh embodiment, further modifies the fourth embodiment so that a gap between a diaphragm valve body and a valve seat of a metal diaphragm is used as the No. 1 orifice 3 and the No. 2 orifices 4a to 4n.

The present invention, in accordance with a twelfth embodiment, further modifies the first embodiment, the second embodiment, or the fourth embodiment, so that either the orifice 3 and the orifice 4, or the No. 1 orifice 3 and the No. 2 orifices 4a to 4n, are made to be 2-step cutting type orifices having 2 different orifices $OL_1$, $OL_2$, and gas is made to flow from an orifice having a smaller diameter to an orifice having a larger diameter.

EFFECT OF THE INVENTION

Due to the fact that a flow rate ratio variable type fluid supply apparatus of the present invention comprises orifices having prescribed diameters ϕ and extremely simple-structured open/close valves Vb to Vn, with which pipe passages can be fully opened or fully closed, it is possible to simplify the structure of the fluid supply apparatus; thus, substantial reduction in size and cost can be achieved.

In accordance with the present invention, the flow rate ratio γ can be changed to a plurality of steps at ease by means of switching open/close valves Vb to Vn appropriately, and the flow diverting ratio γ can also be changed to a plurality of steps at ease by means of changing the orifices themselves. In addition, substantial changes of the flow rate ratio γ can be easily achieved by changing the orifices themselves.

Furthermore, in accordance with the present invention, the correction coefficient can be strictly controlled, and the correction coefficient is made to be 0.7 for an orifice having a diameter ϕ of 0.3 mm or more, and 0.6 for an orifice having a diameter ϕ of 0.3 mm or less, depending on the shape of processing. Hence, the flow rate ratio variable type fluid supply apparatus, in accordance with the present invention, can reduce the error of the flow diverting ratio $Q_1$, $Q_2$ to less than 1% S.P.

REFERENCE CHARACTERS AND NUMERALS

A Flow rate ratio variable type fluid supply apparatus
G Gas
Q Total flow rate
$Q_1$ to $Q_n$ Flow rate of the No. 1 flow diverting pipe passages
$Q_0$ Flow rate of the No. 2 flow diverting pipe passage
$Q_a$ to $Q_d$ Flow rates of diverting or branch pipe passages
γ Flow rate ratio ($Q_1/Q_0$)
OF Orifice member
OL, $OL_1$, $OL_2$ Orifices
1 No. 1 flow diverting pipe passages
2 No. 2 flow diverting pipe passage
2a to 2d Branch pipe passages
3 No. 1 orifices
4 No. 2 orifices
$S_T$ Cross sectional area of the total orifice openings
$S_1$ to $S_n$ Opening area of No. 1 orifices
$S_2a$ to $S_2d$ Opening area of Branch pipe passage orifices
$S_2o$ Total opening area of flow-passable orifices of the No. 2 flow diverting pipe passage 2
ϕ Orifice diameter
Vb to Vd Open/Close valves
5 Gas supply source
6 Flow rate control system
7 Process chamber
8a, 8b $N_2$ supply sources
9 Mol block
10a, 10b Pressure regulators
11 Vacuum gauge
12 Open/close control valve
13 Vacuum pump
$P_2$ Internal gas pressure of the pipe passage
$P_3$ Internal pressure of the chamber
$A_{1a}$ A source of air
$PS_1$ Pressure detector of the pipe passage $GL_1$
$PS_2$ Pressure detector of the pipe passage $GL_2$
14 Outlets

BEST MODE FOR CARRYING OUT THE INVENTION

Figure 1:
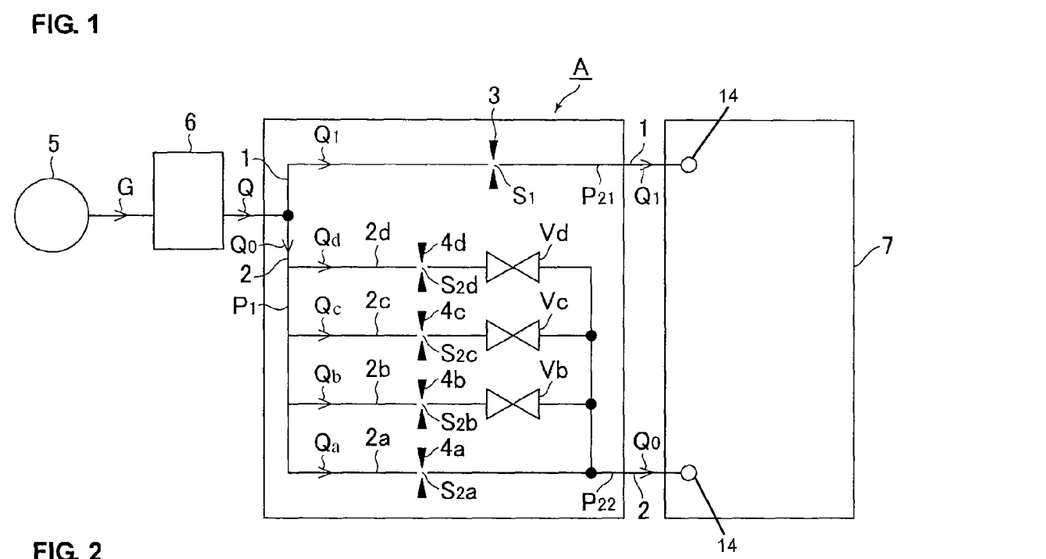
FIG. 1 is a block diagram of an embodiment of a flow rate ratio variable type fluid supply apparatus in accordance with the present invention.

Preferred embodiments in accordance with the present invention are explained hereinafter with reference to drawings. FIG. 1 is a block diagram of a flow rate ratio variable type fluid supply apparatus in accordance with the present invention. In FIG. 1, A designates the flow rate ratio variable type fluid supply apparatus, Q, $Q_a$ to $Q_d$ and Qo designate flow rates, 1 designates the No. 1 flow diverting pipe passage, 2 designates the No. 2 flow diverting pipe passage, 2a, 2b, 2c, 2d designate branch pipe passages, 3 designates that No. 1 orifice, 4a designates the No. 2 orifice, 4b designates the No. 3 orifice, 4c designates the No. 4 orifice, 4d designates the No. 5 orifice, $S_1$, and $S_2a$ to $S_2d$ designate cross sectional areas of orifices, Vb, Vc, Vd designate open/close valves, 5 designates a gas supply source, 6 designates a flow rate control system and 7 designates a process chamber.

The aforementioned fluid supply source 5 is a supply source of various kinds of gas to be used for semiconductor manufacturing. In accordance with the present embodiment, a $N_2$ gas supply source is provided. The flow rate control system 6 regulates the gas flow rate Q supplied to the process chamber 7 at a given flow rate. In accordance with the present embodiment, the apparatus A is made so that $N_2$ gas of a flow rate Q=1 SLM is supplied with the aid of a pressure type flow rate control system FCS.

In accordance with the present embodiment, a chamber having an internal pressure that is regulated to be 10 Torr is employed as the aforementioned process chamber 7, and $N_2$ gas of a desired flow rate $Q_1$ is supplied through the No. 1 flow diverting pipe passage 1 to the center part thereof, and $N_2$ gas of a flow rate $Q_2$ is supplied through the No. 2 flow diverting pipe passage 2 to the peripheral part thereof, respectively.

Gas G supplied from the aforementioned gas supply source 5 is regulated to have a flow rate of, for example, Q=1 SLM using the flow rate control system 6, and then the gas is supplied into the process chamber 7 through the No. 1 flow diverting pipe passage 1 and the No. 2 flow diverting pipe passage 2. The flow rate ratio $\gamma=Q_1/Q_0$ of gas flow passing through the flow diverting pipe passages 1, 2 is regulated according to the predetermined flow diverting ratio $\gamma=Q_1/Q_0$ by means of open/close valves Vb to Vd that are made to be appropriately switched for opening/closing (i.e., full opening or full closing). In accordance with the present embodiment, as mentioned before, $N_2$ gas of Q=1 SLM is supplied as a quantified amount from the flow rate control system 6. In accordance with the present specification, the terms "flow rate ratio" and "flow diverting ratio" are synonymous terms.

With the present embodiment, as below stated, the aforementioned flow rate ratio $\gamma=Q_1/Q_0$ is made so that it can be regulated from 1/1 to 1/1.35 in steps of 5%, thus totaling 8 steps (that is, 1/1, 1/1.05, 1/1.1, 1/1.15, 1/1.20, 1/1.25, 1/1.30, 1/1.35) by means of switching the open/close valves Vc to Vd.

Referring to FIG. 1, the gas flow rate passing through orifices 3, and 4a to 4d is in proportion to the cross sectional area of orifices 3, and 4a to 4d when so-called "expansion conditions" are maintained between pressure $P_1$ on the upstream side and pressure $P_{21}$ and $P_{22}$ on the downstream side from orifices 3, and 4a to 4d. Specifically, under critical expansion conditions, the flow rate ratio of gas passing through the orifices is determined by the ratio of cross sectional areas of the orifices.

Now in accordance with FIG. 1, assuming that cross sectional areas of orifices 3, and 4a to 4d are $S_1$, $S_2a$, $S_2b$, $S_2c$, $S_2d$, respectively, the flow rate of the No. 1 flow diverting pipe passage 1 is $Q_1$, the flow rate of the No. 2 flow diverting pipe passage 2 is $Q_0$, and the supply flow rate in total is Q, so that the flow diverting ratio $\gamma=Q_1/Q_0$ can be expressed by the following equation (1):

$$\gamma=Q_1/Q_0=S_1/(S_2a+(S_2b+S_2c+S_2d)) \quad (1)$$

As stated above, the flow diverting ratio $\gamma$ is made to be $\gamma$=1/1 to 1/1.35 (in 8 steps for every 5%), thus it being needed that the following equations (2) and (3) hold, namely $$S_1/S_2a=1/1 \quad (2),$$

$$S_2a/S_2b/S_2c/S_2d=100/20/10/5 \quad (3).$$

Next, computation of the total sum of the cross sectional areas of orifices $S_1$, and $S_2a$ to $S_2d$, and of the individual cross sectional areas $S_1$, and $S_2a$ to $S_2d$ is explained. Now, when the internal pressure of the chamber 7 is made to be 10 Torr, then pressure $P_{21}$, $P_{22}$ of the downstream side from the orifice is approximately 20 Torr at the maximum when taking pressure loss of valves Vb to Vd, and the like, into consideration. In order that critical expansion conditions hold, it is required that the total cross sectional area $S_T$ of all orifices is determined so that pressure $P_1$ on the upstream side from the orifice becomes 40 Torr (i.e., $P_1/P_2$=more than 2) when valves Vb to Vd are fully opened.

In accordance with the present invention, the total sum $S_T$ of the cross sectional areas of orifices $S_1$, and $S_2b$ to $S_2d$ is computed using the equations for the orifice CV value, as shown in the below-mentioned equations (4) and (5):

$$Cv=\alpha \times S_T/17 \quad (4),$$

$$Cv=Qg/(2019 \times P_1) \times (Gg(273+t)) \quad (5).$$

In equations (4) and (5), a designates a correction coefficient (i.e, 0.8), $S_T$ designates the total cross sectional area of all orifices (mm²), Qg designates the flow rate (i.e., m³/h=0.06), $P_1$ designates pressure on the upstream side from an orifice (i.e., MPa abs=0.0053), Gg designates the specific gravity of the gaseous fluid (e.g., 0.97), t designates fluid temperature (i.e., ° C.=21). In accordance with the present embodiment, all computations are performed for the total flow rate Q of the gas is 1 SLM, pressure $P_1$ on the upstream side from the orifice is 40 Torr, the type of gas used is $N_2$, and the gas temperature is 21° C.

In accordance with the aforementioned equations (4) and (5), the total sum $S_T$ of the cross sectional opening areas of orifices $S_1$, and 52a to $S_2d$ becomes $S_T$=2.01 mm², and with the aforementioned equations (1) to (3), the cross sectional opening areas of orifices $S_1$, and $S_2a$ to $S_2d$ become $S_1=S_2a$=0.855 mm², $S_2b$=0.171 mm², $S_2c$=0.086 mm², and $S_2d$=0.043 mm², respectively.

Now, as shown in FIG. 1, for example, when open/close valves Vb to Vd are made or operated to be fully opened, then the flow ratio $\gamma$ becomes $\gamma=Q_1/Q_0=S_1/(S_2a+S_2b+S_2c+S_2d)$=1/1.35. When the open/close valves Vb to Vd are made, or operated, to be fully closed, then the flow ratio $\gamma$ becomes $\gamma=Q_1/Q_0=S_1/S_2a$=1/1. Furthermore, when the open/close valve Vb is made to be opened, and valves Vc and Vd are made to be closed, then the flow ratio $\gamma$ becomes $\gamma=Q_1/Q_0=S_1/(S_1a+S_2b)$=1/1.2, and the flow ratio $\gamma=Q_1/Q_0$ is regulated between 1/1 and 1/1.35 in 8 steps for every 5% by means of switching the state of the open/close valves Vb to Vd. In accordance with the embodiment shown in FIG. 1, the apparatus A is made so that gas flow is supplied to the chamber 7 through two flow diverting pipe passages, namely, the No. 1 flow diverting pipe passage 1 and the No. 2 flow diverting pipe passage 2. However, it goes without saying that three or more flow diverting pipe passages can be employed, and one or a plurality of pipe passages among them can be equipped with a plurality of branch pipe passages.

Embodiment 1

Figure 2:
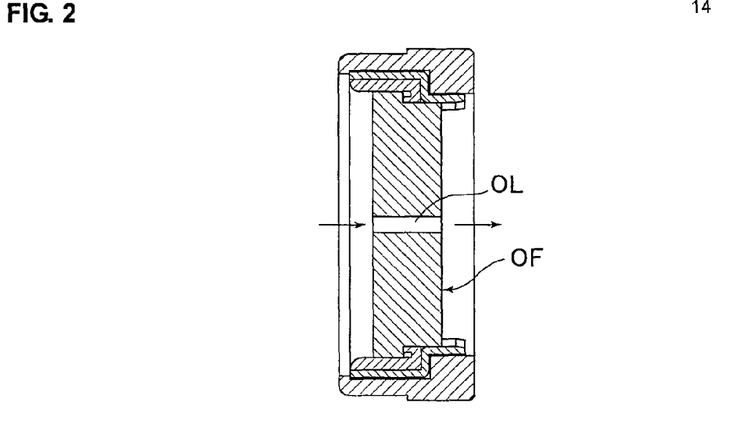
FIG. 2 is a cross sectional view of a 1-step cutting type orifice.
Figure 3:
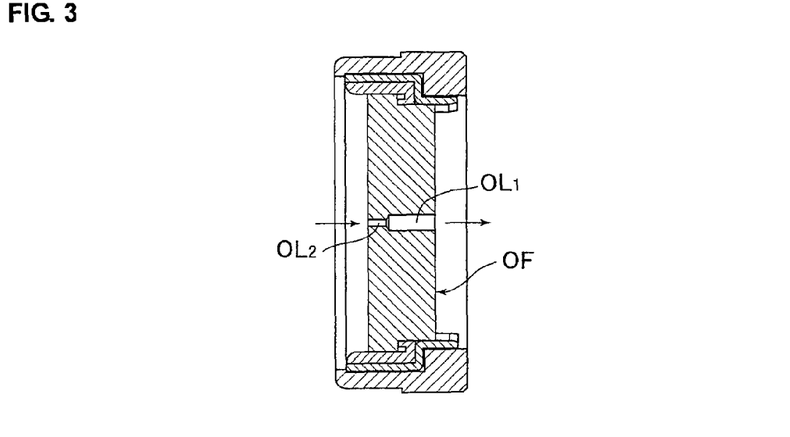
FIG. 3 is across sectional view of a 2-step cutting type orifice.

It is necessary, in reality, that actually measured values are provided regarding the flow rate characteristics and correction coefficient for an orifice member OF having a small cross sectional area. Therefore, measurements of correction coefficients, and the like, were conducted on two types of orifices OF, as shown in FIG. 2 and FIG. 3, by using the flow rate characteristics testing device shown in FIG. 4. Specifically, in accordance with the present embodiment, an orifice OL is formed by performing 1-step cutting of an orifice member OF having an internal diameter of 0.3 mm or more, as shown in FIG. 2, and an orifice OL is formed by performing 2-step cutting of $OL_1$, $OL_2$ in the orifice member OF having an internal diameter of 0.3 mm or less as shown in FIG. 3. Whether to choose 1-step cutting or 2-step cutting is determined appropriately depending on the thickness of the orifice member, accuracy of the processing machine, and the like.

The orifice member OF is formed as a so-called gasket type. The orifice member OF is changeably and hermetically inserted and fixed into an orifice holder (not illustrated) that is inserted into a pipe passage. In accordance with the present embodiment, orifice members as shown in FIG. 2 are employed as orifice members having diameters of 0.3 mm, 0.4 mm and 0.9 mm, and an orifice member as shown in FIG. 3 is employed as an orifice member having a diameter of 0.2 mm.

Figure 4:
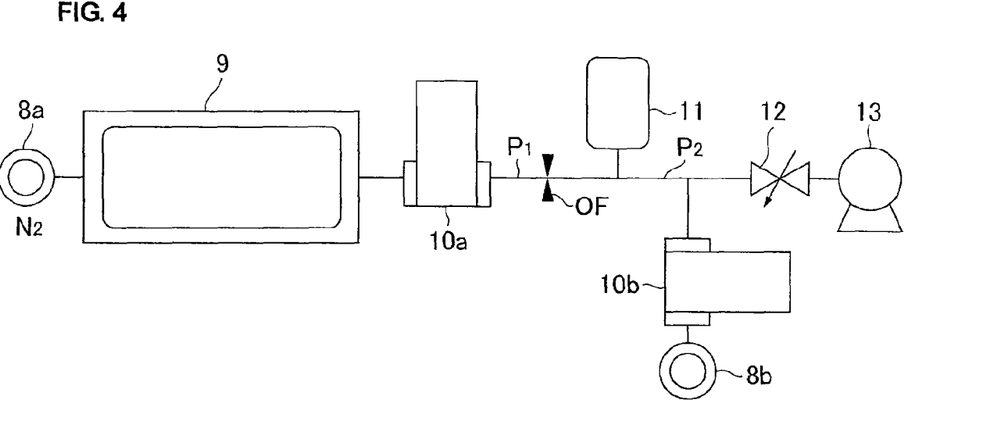
FIG. 4 is a block diagram of a test device for testing flow rate characteristics of an orifice.

Flow rate characteristics and correction coefficient of each orifice member OF were actually measured with the testing device as shown in FIG. 4. In particular, as shown in FIG. 4, $8a$, $8b$ designate $N_2$ supply sources, 9 designates a mol block, $10a$, $10b$ designate pressure regulators, OF designates an orifice member, 11 designates a vacuum gauge (100 Torr Baratron), 12 designates an open/close control valve, and 13 designates a vacuum pump. In this case, the measurement accuracy of the mol block is ±0.2% rdg, the measurement accuracy of the pressure regulators $10a$, $10b$ is ±0.2% F.S. (1 to 40%) and ±0.5% S.P. (40 to 100%).

Pressure $P_1$ on the upstream side from the orifice member OF was regulated using a pressure regulator $10a$, and the gas flow rate passing through the orifice was measured with a mol block 9. Pressure on the downstream side from the orifice member OF was regulated using a downstream side pressure adjustor $10b$, thus the dependence of the downstream side pressure $P_2$ was ascertained.

Figure 5:
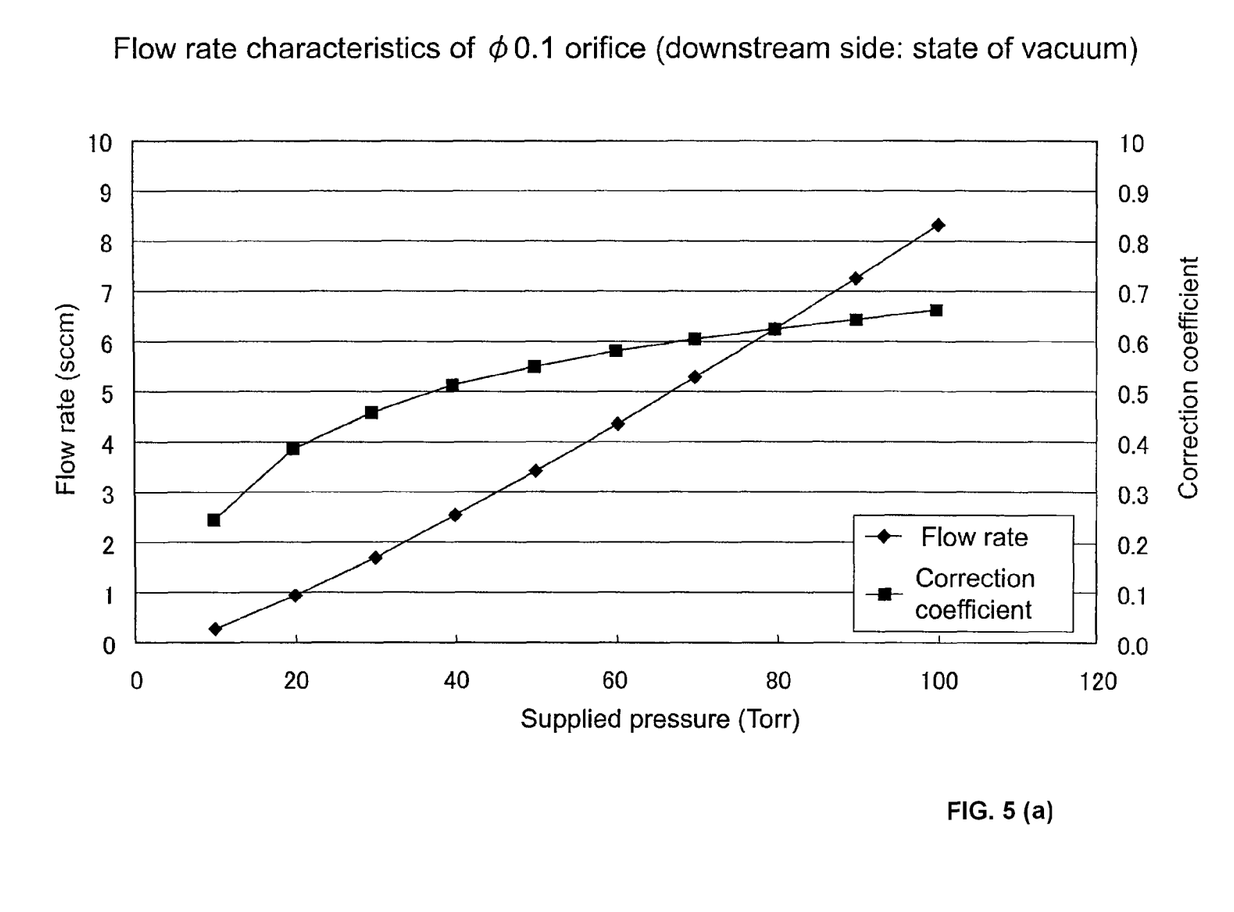
FIGS. 5a and 5b show flow rate characteristics of orifices of diameter ϕ=0.1 mm and ϕ=0.55 mm, respectively, and computation values of the corresponding correction coefficient of these orifices.

FIG. 5($a$) and FIG. 5($b$) show flow rate characteristics of orifice members OF in accordance with the present embodiment. FIG. 5($c$) shows the correction coefficient α computed from the data of FIG. 5($a$) and FIG. 5($b$).

Using the test results of the aforementioned embodiment 1, orifice diameters and correction coefficients of the No. 1 flow diverting pipe passage 1 and branch pipe passages $2a$, $2b$, $2c$, $2d$, shown in FIG. 1, are selected by making pressure $P_1$ on the upstream side from the orifices 64 Torr.

Figure 6:
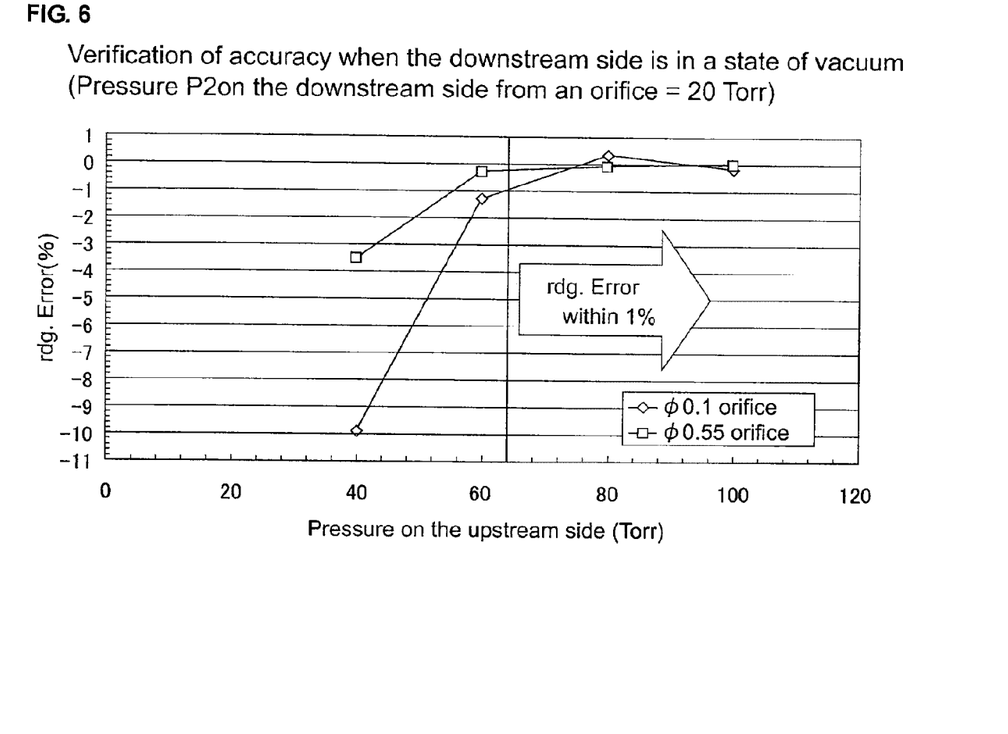
FIG. 6 shows the relationship between pressure $P_1$ on the upstream side from an orifice and the flow rate measuring error (rdg error) in the case when pressure $P_2$ on the downstream side from an orifice OF is made to be 20 Torr.

FIG. 6 shows the relationship between pressure $P_2$ on the upstream side from an orifice and flow rate measuring accuracy in the case wherein pressure $P_2$ on the downstream side from the orifice member OF is made to be 20 Torr. When pressure $P_2$ on the downstream side from an orifice reaches 20 Torr, it is understood, as apparent from FIG. 6, that pressure $P_1$ on the upstream side from the orifice must be maintained more than 64 Torr in order that the measurement value error (rdg. error) be kept within 1% so as to make the measurement accuracy the same as that when pressure $P_2$ on the downstream side from the orifice is made to be in a state of vacuum.

Table 2 shows the measurement results obtained from the aforementioned embodiment. It is necessary that the total cross sectional opening area be 1.018 mm² when pressure $P_1$ on the upstream side from the orifice is 64 Torr, the gas supply flow rate Q is 1 SLM, the gas temperature is 21° C., the coefficient of the gas (i.e., the gas specific gravity) is 0.97 ($N_2$), and correction coefficient is 1. When the area ratio of the orifices is made to be the same (i.e., $S_1/S_2a/S_2b/S_2c/S_2d=100/100/20/10/5$) as in FIG. 1, the orifices 3, and $4a$ to $4d$, the flow rate ratio γ, the cross sectional orifice area (correction coefficient 0.6 and 0.7), the computed orifice diameter (mm²) (correction coefficient 0.6 and 0.7), and the selected diameter (mm) of the orifice as measured, are as shown in Table 2.

TABLE 2

| Reference characters and numerals for orifice | Flow rate ratio | Cross section area (mm²) (Correction coefficient: 1) | Cross section area (mm²) (Correction coefficient: 0.6) | Cross section area (mm²) (Correction coefficient: 0.7) | Orifice diameter (mm) (Correction coefficient: 0.6) | Orifice diameter (mm) (Correction coefficient: 0.7) | Selected orifice diameter (mm) |
|---|---|---|---|---|---|---|---|
| 3 | 100 | 0.433 | 0.722 | 0.619 | 0.959 | 0.888 | 0.9 |
| 4b | 20 | 0.087 | 0.144 | 0.124 | 0.429 | 0.397 | 0.4 |
| 4c | 10 | 0.043 | 0.072 | 0.062 | 0.303 | 0.281 | 0.3 |
| 4d | 5 | 0.022 | 0.036 | 0.031 | 0.214 | 0.198 | 0.2 |
| 4a | 100 | 0.433 | 0.722 | 0.619 | 0.959 | 0.888 | 0.9 |

In the case wherein the orifice diameter has been manufactured in actuality to be 0.5 mm, it is desirable that the correction coefficient of 0.6 is chosen for an orifice diameter of 0.25 mm or less, and that the correction coefficient of 0.7 is chosen for an orifice diameter of 0.30 mm or more.

In accordance with the aforementioned embodiment, there are employed two flow diverting pipe passages, namely, the No. 1 flow diverting pipe passage 1 and the No. 2 flow diverting passage 2. However, it goes without saying that more than two flow diverting pipe passages can be employed. In the case wherein a plurality of flow diverting pipe passages are employed, one or more of the flow diverting pipe passages among them are made to be ones equipped with the orifice 3, which has a given opening area $S_1$, and the remaining flow diverting pipe passages are made to be ones equipped with branch pipe passages $2a$ to $2d$.

Furthermore, in accordance with the aforementioned embodiment, it is possible that when setting the flow rate ratio

TABLE 1

| Pressure P1 on the upstream side from orifices (Torr) | Correction coefficient | Flow rate ratio | Reference characters and numerals for flow diverting pipe passage and branch pipe passages in FIG. 1 | Orifice diameter (mm) |
|---|---|---|---|---|
| 64 | 0.7 | 100 | 1 | 0.9 |
|  | 0.6 | 5 | 2d | 0.2 |
|  | 0.7 | 10 | 2c | 0.3 |
|  | 0.7 | 20 | 2b | 0.4 |
|  | 0.7 | 100 | 2a | 0.9 | as 1/1.35, the flow diverting ratio may be selected in 8 steps for every 0.5. However, it goes without saying that the range and switching size of the flow diverting ratio can be set arbitrarily.

In addition, with the present embodiment, it is basically so made that an orifice is employed. However, to replace an orifice, a so-called critical nozzle or a gap between a valve body and a valve seat of a metal touch type diaphragm valve can be also employed.

In accordance with the aforementioned embodiment shown in FIG. 1, there is formed the No. 1 orifice 3, having a given opening area $S_1$, within the one orifice piece. However, it is possible that the No. 1 orifice 3, having a given opening area $S_1$, ($S_1=S_{11}+S_{12}$), is formed by means of an orifice 3a having a given opening area $S_{11}$ and an orifice having an adjustable opening area $S_{12}$ (e.g. a metal touch type diaphragm valve, and the like) that are connected in parallel. Consequently, this structure is useful because, by making the opening area $S_{12}$ of one orifice out of two component orifices adjustable, the size of the opening area $S_1$ of the No. 1 orifice 3 is regulated over a certain range, and then is fixed following adjustment.

Figure 11:
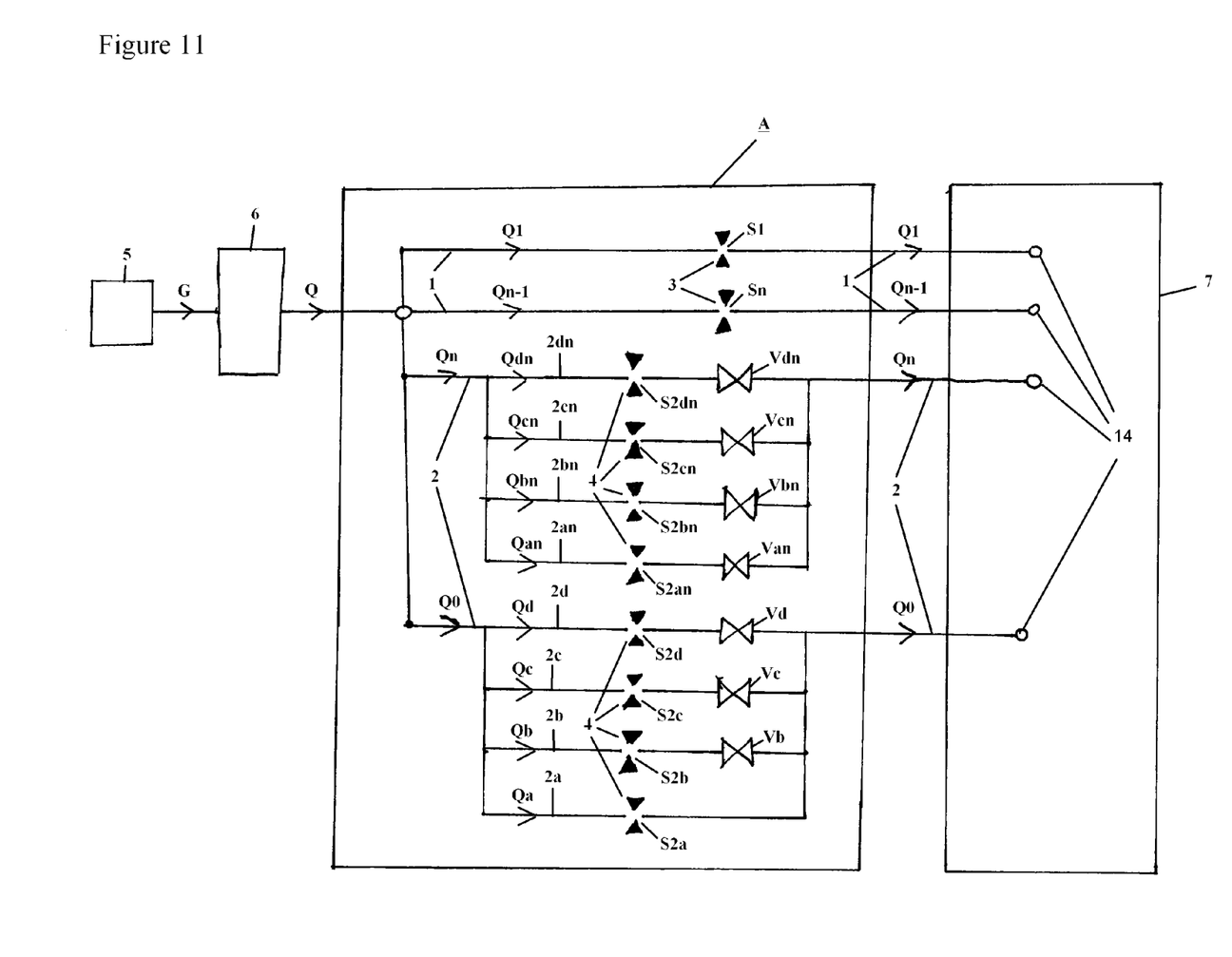
FIG. 11 is a block diagram of another embodiment of a flow rate ratio variable type fluid supply apparatus in accordance with the present invention.
Figure 12:
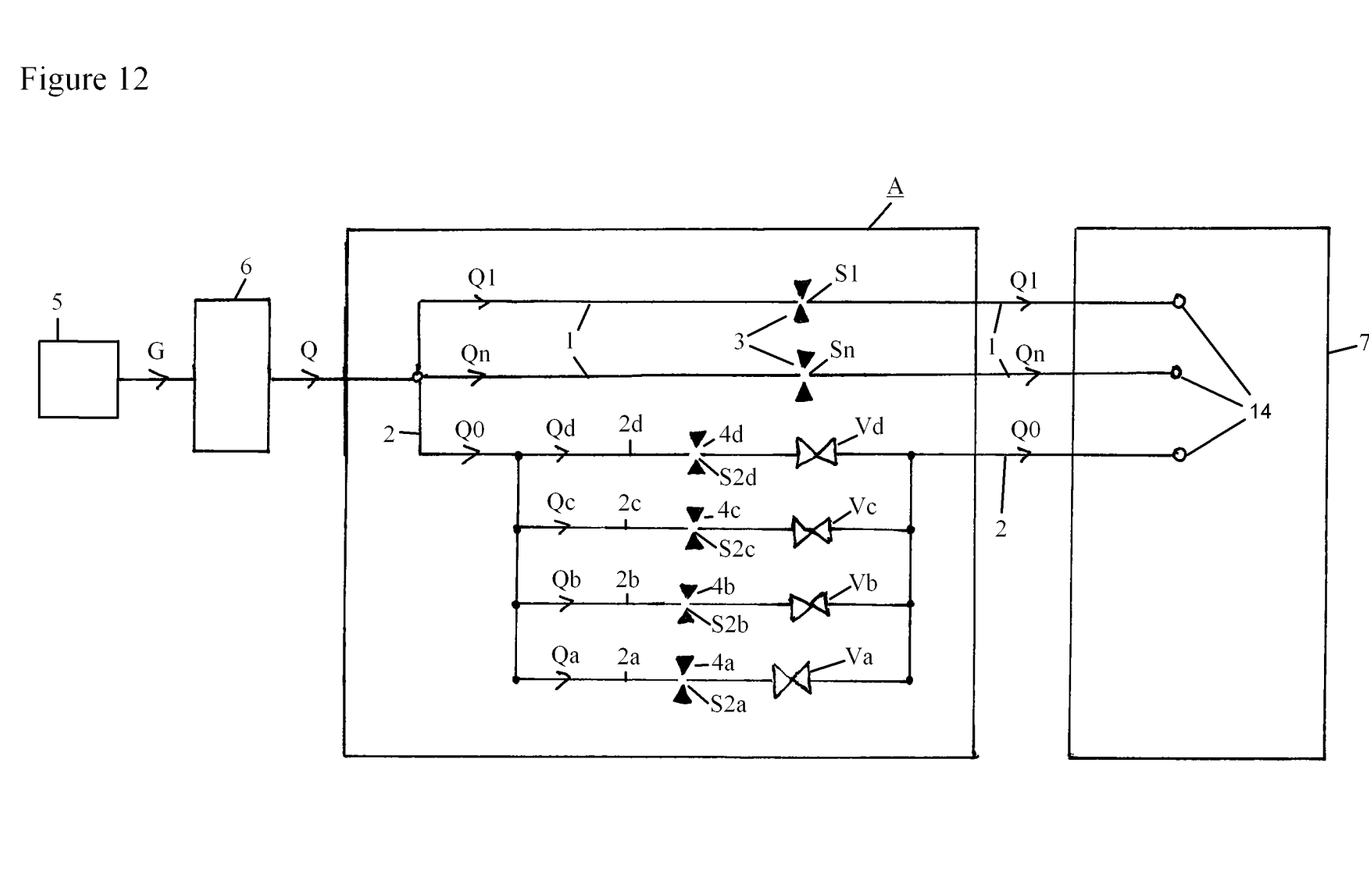
FIG. 12 is a block diagram of another embodiment of a flow rate ratio variable type fluid supply apparatus in accordance with the present invention.

FIGS. 11 and 12 are block diagrams of a flow rate ratio variable type fluid supply apparatus in accordance with the present invention. In FIGS. 11 and 12, Q, $Q_0$, $Q_1$, and $Q_a$ to $Q_d$, designate flow rates. 1 designates the No. 1 flow diverting pipe passages, 2a, 2b, 2c, and 2d designate branch pipe passages, 3 designates the No. 1 orifices, 4 designates the No. 2 orifices, $S_1$ to $S_n$ and $S_2a$ to $S_2d$ designate cross sectional areas of orifices, Va, Vb, Vc, and Vd designate open/close valves, 6 designates a flow rate control system and 7 designates a process chamber.

The present invention can be utilized not only as a flow rate ratio variable type fluid supply apparatus, with which gases are supplied to a chamber used with semiconductor manufacturing facilities, but also as a flow rate ratio variable type fluid supply apparatus for supplying gases to various gas supply equipment.

What is claimed is:

1. A flow rate ratio variable type fluid supply apparatus, comprising:
   (a) a flow rate control system, wherein the flow rate control system supplies gas of a flow rate Q;
   (b) a plurality of first flow diverting pipe passages connected to the flow rate control system so that gas of flow rate Q is diverted to the plurality of first flow diverting pipe passages, wherein each first flow diverting pipe passage is supplied with a prescribed flow rate of diverted gas so that gas of flow rate Q is supplied to a chamber through a plurality of outlets;
   (c) at least one first orifice member installed on at least one of the plurality of first flow diverting pipe passages, wherein each first orifice member comprises a first orifice formed therein having a first opening area, and any first flow diverting pipe passages that does not have a first orifice member installed forms a second flow diverting pipe passage to which a plurality of branch pipe passages are connected in parallel, wherein the plurality of outlets consists of the outlets of the plurality of first flow diverting pipe passages and the outlets of the second flow diverting pipe passages so that the gas of flow rate Q is supplied to a plurality of positions in the chamber through the plurality of outlets;
   (d) a plurality of second orifice members installed on the plurality of branch pipe passages, wherein each second orifice member comprises a second orifice formed therein having a second opening area; and
   (e) a plurality of open/close valves installed on all, or some of the plurality of branch pipe passages so that gas of flow rate Q is diverted and flows to the plurality of first flow diverting pipe passages with a flow rate ratio for each first flow diverting pipe passage that is equivalent to the ratio of the respective first opening area of the corresponding first orifice member on the corresponding first flow diverting pipe passage and a total opening area of all flow-passable second orifices, wherein the total opening area is the sum of the second opening areas of those second orifice members that are flow-passable, and wherein the flow rate ratio is regulated by an open/close operation of the open/close valves installed on the branch pipe passages.

2. A flow rate ratio variable type fluid supply apparatus according to claim 1, wherein the first orifice formed in the first orifice member comprises a first orifice portion that has a constant opening area connected in parallel with a second orifice portion that has an adjustable opening area.

3. A flow rate ratio variable type fluid supply apparatus according to claim 1, wherein the first orifice and the second orifice are 2-step cutting type orifices having two different orifice portions of different diameter, wherein each 2-step cutting type orifice is arranged so that gas flows from a first step orifice portion of the 2-step cutting type orifice to a second step orifice portion of the 2-step cutting type orifice, and wherein the second step orifice portion has a larger diameter than the first step orifice portion.

4. A flow rate ratio variable type fluid supply apparatus, comprising:
   (a) a flow rate control system, wherein the flow rate control system supplies gas of a flow rate Q;
   (b) a plurality of first flow diverting pipe passages connected to the flow rate control system so that gas of flow rate Q is diverted to flow to the plurality of first flow diverting pipe passages, wherein each first flow diverting pipe passage is supplied with a prescribed flow rate of diverted gas so that gas of flow rate Q is supplied to a chamber through a plurality of outlets;
   (c) a plurality of first orifice members installed on all but one of the plurality of first flow diverting pipe passages, wherein each first orifice member comprises a first orifice having a corresponding first opening area, and the one first flow diverting pipe passage without a first orifice member forms a second flow diverting pipe passage to which a plurality of branch pipe passages are connected in parallel, wherein the plurality of outlets consists of the outlets of the plurality of first flow diverting pipe passages and the outlet of the second flow diverting pipe passage so that the gas of flow rate Q is supplied to a plurality of positions in the chamber through the plurality of outlets;
   (d) a plurality of second orifice members installed on the plurality of branch pipe passages so that there is a second orifice member installed on each of the plurality of branch pipe passages, and each second orifice member comprises a second orifice having a corresponding second opening area; and
   (e) a plurality of open/close valves installed on all, or some of, the plurality of branch pipe passages so that gas of flow rate Q is diverted to flow to the plurality of first flow diverting pipe passages with a flow rate ratio equivalent to the ratio of the respective first opening area of the corresponding first orifice member on the corresponding first flow diverting pipe passage and a total opening area of a flow-passable orifices on the one second flow diverting pipe passage, wherein the total opening area of the flow-passable orifices on the second flow diverting pipe passage is regulated by open/close operation of the plurality of open/close valves installed on the plurality of branch pipe passages.

5. A flow rate ratio variable type fluid supply apparatus according to claim 4, wherein the first orifice formed in the first orifice member comprises a first orifice portion that has a constant opening area connected in parallel with a second orifice portion that has an adjustable opening area.

6. A flow rate ratio variable type fluid supply apparatus according to claim 4, wherein the first orifice and the second orifice are 2-step cutting type orifices having two different orifice portions of different diameter, wherein each 2-step cutting type orifice is arranged so that gas flows from a first step orifice portion of the 2-step cutting type orifice to a second step orifice portion of the 2-step cutting type orifice, and wherein the second step orifice portion has a larger diameter than the first step orifice portion.

7. A flow rate ratio variable type fluid supply apparatus, comprising:
(a) a chamber, wherein the chamber is a semiconductor manufacturing chamber, and wherein the chamber has two gas supply locations;
(b) a flow rate control system, wherein the flow rate control system supplies gas of a flow rate Q to the chamber, and wherein the two gas supply locations are a first supply location and a second supply location;
(c) a first flow diverting pipe passage and a second flow diverting pipe passage connected to the flow rate control system so that gas of flow rate Q is diverted to flow to the first flow diverting pipe passage so that gas of flow rate $Q_1$ flows through the first flow diverting pipe passage and gas of flow rate $Q_0$ flows through the second flow diverting pipe passage, wherein $Q=Q_1+Q_0$, so that gas of flow rate Q is supplied by the combined flow of gas through an outlet of the first flow diverting pipe passage and an outlet of the second flow diverting pipe passage, respectively, to the first supply location and the second supply location in the chamber at the gas flow rate Q;
(d) a first orifice member installed on the first flow diverting pipe passage, wherein the first orifice member comprises a first orifice having a corresponding first opening area;
(e) a plurality of branch pipe passages connected in parallel to the second flow diverting pipe passage;
(f) a plurality of second orifice members installed on the plurality of branch pipe passages so that each branch pipe passage has a second orifice member installed thereon, wherein each second orifice member comprises a second orifice having a corresponding second opening area; and
(g) a plurality of open/close valves installed on all, or some of the branch pipe passages so that gas of flow rate Q is diverted to flow to the first flow diverting pipe passage at the flow rate $Q_1$ and to the second flow diverting pipe passage at the flow rate $Q_0$ with a flow rate ratio $Q_1/Q_0$ equivalent to the ratio of the first opening area of the first orifice installed on the first flow diverting pipe passage and a total opening area of flow-passable orifices of the second flow diverting pipe passage, wherein the flow rate ratio $Q_1/Q_0$ is regulated by controlling the total opening area of the flow-passable orifices of the second flow diverting pipe passage by open/close operation of the open/close valves installed on the branch pipe passages.

8. A flow rate ratio variable type fluid supply apparatus according to claim 7, wherein the first orifice formed in the first orifice member comprises a first orifice portion that has a constant opening area connected in parallel with a second orifice portion that has an adjustable opening area.

9. A flow rate ratio variable type fluid supply apparatus according to claim 7, wherein the plurality of branch pipe passages includes a first branch pipe passage comprising a third orifice formed therein, wherein the third orifice has a third opening area and the first opening area of the first orifice member of the first flow diverting pipe passage is made to be identical to the third opening area, and the first branch pipe passage is connected to the second flow diverting pipe passage without an open/close valve being installed on the first branch pipe passage.

10. A flow rate ratio variable type fluid supply apparatus according to claim 7, wherein four branch pipe passages are connected in parallel to the second flow diverting pipe passage, wherein the four branch pipe passages include a first branch pipe passage comprising a third orifice formed therein that has a third opening area, a second branch pipe passage comprising a fourth orifice formed therein that has a forth opening area, a third branch pipe passage comprising a fifth orifice formed therein that has a fifth opening area, and a fourth branch pipe passage comprising a sixth orifice formed therein that has a sixth opening area, wherein the third opening area of the third orifice of the first branch pipe passage and the first opening area of the first orifice member of the first flow diverting pipe passage are identical, and the fourth opening area, the fifth opening area, and the sixth opening area of the fourth orifice, the fifth orifice, and the sixth orifice, respectively, of the second branch pipe passage, the third branch passage, and the fourth branch passage, respectively, are made to be 5%, 10% and 20%, respectively, of the first opening area of the first orifice of the first flow diverting pipe passage, and each of the second branch pipe passage, the third branch pipe passage, and the fourth branch pipe passage has an open/close valve installed thereon.

11. A flow rate ratio variable type fluid supply apparatus according to claim 7, wherein the open/close valves are valves having an open/close operation so that the branch pipe passages having an open/close valve installed thereon can be only either fully opened or fully closed.

12. A flow rate ratio variable type fluid supply apparatus according to claim 7, wherein the first opening area of the first orifice, and the second opening area of each second orifice, is set at an appropriate value by selection of a correction coefficient depending on orifice shape and pressure conditions upstream from each orifice, respectively.

13. A flow rate ratio variable type fluid supply apparatus according to claim 12, wherein the correction coefficient is selected to be 0.6 or 0.7 depending on how the shape of a diameter $\phi$ of the first orifice and the second orifices are processed.

14. A flow rate ratio variable type fluid supply apparatus according to claim 7, wherein a gap between a diaphragm body and a valve seat of a metal diaphragm serves as the first orifice and as the second orifices.

15. A flow rate ratio variable type fluid supply apparatus according to claim 7, wherein the first orifice and the second orifice are 2-step cutting type orifices having two different orifice portions of different diameter, wherein each 2-step cutting type orifice is arranged so that gas flows from a first step orifice portion of the 2-step cutting type orifice to a second step orifice portion of the 2-step cutting type orifice, and wherein the second step orifice portion has a larger diameter than the first step orifice portion.

* * * * *